(12) United States Patent
Yamato

(10) Patent No.: US 7,123,643 B2
(45) Date of Patent: Oct. 17, 2006

(54) COMMUNICATION CONNECTION SET UP METHOD USING PREDICTED ID PACKET RECEIVING PROCESSING START TIME

(75) Inventor: Katsumi Yamato, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 773 days.

(21) Appl. No.: 10/397,306

(22) Filed: Mar. 27, 2003

(65) Prior Publication Data

US 2003/0186683 A1    Oct. 2, 2003

(30) Foreign Application Priority Data

Mar. 29, 2002    (JP)    ............... 2002-093666

(51) Int. Cl.
*H04B 1/713*    (2006.01)
(52) U.S. Cl. .................................. 375/133
(58) Field of Classification Search ........ 375/132–137; 340/870.06, 870.11, 870.03, 870.16
See application file for complete search history.

(56) References Cited

U.S. PATENT DOCUMENTS

| | | | |
|---|---|---|---|
| 6,188,715 B1 * | 2/2001 | Partyka | 375/134 |
| 6,535,544 B1 * | 3/2003 | Partyka | 375/132 |
| 6,920,171 B1 * | 7/2005 | Souissi et al. | 375/133 |
| 2002/0037700 A1 | 3/2002 | Dooley et al. | |

FOREIGN PATENT DOCUMENTS

| | | |
|---|---|---|
| JP | 08-204604 | 8/1996 |
| JP | 2003-500892 | 7/2003 |
| WO | 00/70792 | 11/2000 |
| WO | 02/25873 A2 | 3/2002 |

OTHER PUBLICATIONS

Bluetooth Specification Version 1.1; Baseband Specification, pp. 96-104, "Access Procedures", Feb. 22, 2001.

* cited by examiner

*Primary Examiner*—Khanh Tran
(74) *Attorney, Agent, or Firm*—Oblon, Spivak, McClelland, Maier & Neustadt, P.C.

(57) ABSTRACT

In a method for setting up a communication connection between radio communication devices which carry out data communications by using a frequency hopping scheme, the first radio communication device predicts a time at which a receiving processing of an identification packet containing an identifier for uniquely identifying the second radio communication device becomes possible at the second radio communication device, and transmits the identification packet to the second radio communication device, at the time at which the receiving processing of the identification packet becomes possible at the second radio communication device, in order to synchronize a frequency hopping pattern between the first radio communication device and the second radio communication device.

8 Claims, 6 Drawing Sheets

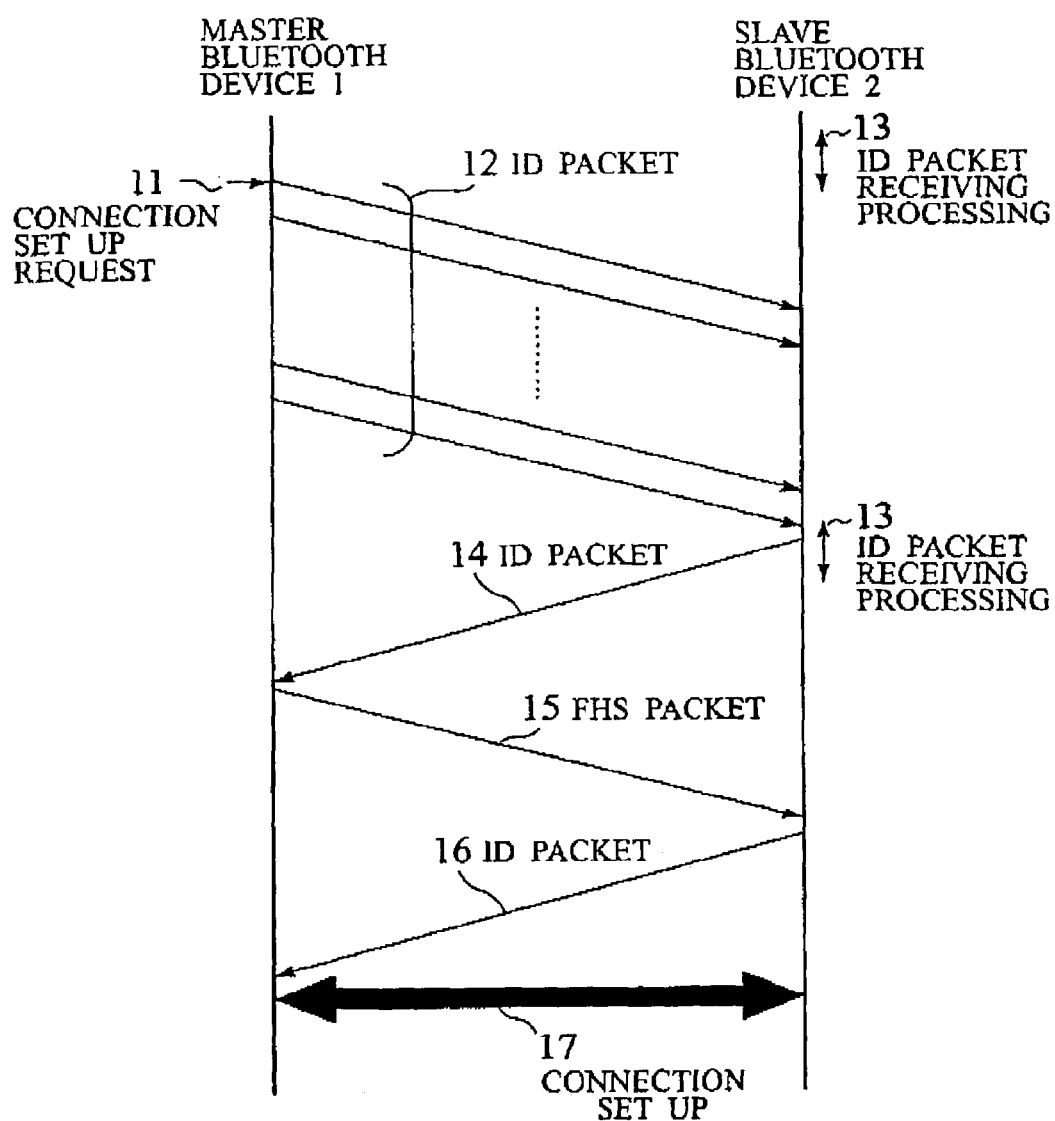

COMMUNICATION CONNECTION SET UP METHOD USING PREDICTED ID PACKET RECEIVING PROCESSING START TIME

BACKGROUND OF THE INVENTION

1. Field of the Invention

The present invention relates to a method for setting up a communication connection between short range radio communication devices, especially Bluetooth (registered trademark) devices.

2. Description of the Related Art

In recent years, systems adopting the Bluetooth (registered trademark) specification for carrying out data transmission and reception between devices by using the frequency hopping in 2.4 GHz band have been developed for the short range radio communications.

For example, by implementing radio modules of the Bluetooth (registered trademark) specification in devices such as portable telephone terminals, PHS (Personal Handyphone System) terminals, PCs, or portable information terminals, it becomes possible to carry out transmission and reception of data between these devices. In the following, a device in which the radio module of the Bluetooth (registered trademark) specification is implemented will be referred to as a BT device.

According to the Bluetooth (registered trademark) specification, the following two procedures are necessary in the case of setting up a connection by using an ACL (Asynchronous Connection-Less) link for carrying out the packet exchange communications between the BT devices.

(1) Detecting the BT devices located in the surrounding (the inquiry procedure); and (2) Setting up a connection with arbitrary BT device (the paging procedure).

First, by carrying out the inquiry procedure of (1), all the BT devices located in a vicinity of one BT device are detected, and the BD_ADDR (Bluetooth (registered trademark) device address), the native clock value, etc., of each detected BT device are acquired.

Next, by carrying out the paging procedure of (2) with respect to the BT device which is a communication target, a connection with this BT device is set up.

FIG. 6 shows the outline of the paging procedure. In FIG. 6, the BT device on a side that made the connection set up request with respect to the arbitrary BT device is referred to as a "master BT device 1", and the correspondent BT device for which the connection is set up by the master BT device is referred to as a "slave BT device 2".

When the connection set up request with respect to the slave BT device 2 is generated at the master BT device 1 (the step 11 in FIG. 6), the master BT device 1 starts the paging procedure.

The master BT device 1 that started the paging procedure repeatedly transmits the ID packet that contains a device access code of the slave BT device 2 by using different frequencies (step 12 of FIG. 6).

Note that the device access code is a code derived from the BD_ADDR, and the master BT device 1 already acquired the BD_ADDR of the slave BT device 2 by the inquiry procedure, so that it is possible to derive the device access code of the slave BT device 2.

Also, the frequencies to be used by the master BT device 1 in transmitting the ID packets are obtained as the hop frequencies that can be obtained from the BD_ADDR of the slave BT device 2.

In the case of using the 79-hop system as the frequency hopping scheme, 32 hop frequencies are selected as the hop frequencies to be used in transmitting the ID packets.

These 32 hop frequencies are grouped into two groups with 16 hop frequencies each, which will be referred to as a train A and a train B. Note that the method for selecting the hop frequencies according to the BD_ADDR is specified in the Bluetooth (registered trademark) specification.

Then, the master BT device 1 transmits the ID packets by using all of the 16 hop frequencies belonging to the train A during a period of 10 ms.

The master BT device 1 consecutively repeats this processing for a prescribed number of times (Npage), and then, repeats the processing for transmitting the ID packets by using all of the 16 hop frequencies belonging to the train B during a period of 10 ms, for the same prescribed number of times. This ID packet transmission processing is continued until a response from the slave BT device 2 is obtained.

Now, the slave BT device 2 periodically carries out the processing for receiving the ID packet containing the own device access code (step 13 of FIG. 6). In this receiving processing, the slave BT device 2 checks whether the ID packet arrives or not by scanning only one frequency selected by the own native clock value among the 32 hop frequencies derived from the own BD_ADDR.

The slave BT device 2 carries out the scanning of only one frequency selected from the own native clock value, so that the frequency that is conjectured to be scanned by the slave BT device 2 is included in the train A that contains the frequencies to be used in transmitting the ID packets first, at a time of grouping the 32 hop frequencies into the train A and the train B at the master BT device 1.

The master BT device 1 acquires the native clock value of the slave BT device at a timing of the inquiry procedure by carrying out the inquiry procedure, and maintains a difference in the clock value by comparing the acquired native clock value with the native clock value of the master BT device 1 itself.

Then, at a time of selecting the hop frequency, the native clock value of the slave BT device 2 is estimated from this difference in the clock value, and the frequency that is most likely scanned by the slave BT device 2 is conjectured.

When the slave BT device 2 receives the ID packet containing the own device access code, the slave BT device 2 returns the ID packet containing the own device access code to the master BT device 1 in response (step 14 of FIG. 6).

When the ID packet as a response from the slave BT device 2 is received, the master BT device 1 describes the BD_ADDR, the native clock value, etc., of the master BT device 1 itself as an FHS (Frequency Hop Synchronization) packet, and transmit it to the slave BT device 2 (step 15 of FIG. 6).

When the FHS packet received, the slave BT device 2 returns the ID packet as a response (step 16 of FIG. 6), and carries out the processing for synchronizing with the native clock of th master BT device 1 according to information contained in the FHS packet.

When the ID packet from the slave BT device 2 is received, the connection between the master BT device 1 and the slave BT device 2 is set up (step 17 of FIG. 6), and the data communications using this connection become possible.

Here, the master BT device 1 is going to transmit the ID packet to the slave BT device 2 repeatedly since the connection set up request with respect to the slave BT device 2 is generated until the ID packet as a response is received from the slave BT device 2.

However, the slave BT device 2 carries out the processing for receiving the ID packet transmitted from the master BT device 1 not constantly but at interval of a prescribed period.

For this reason, the ID packet transmitted from the master BT device 1 while the slave BT device 2 is not carrying out the ID packet receiving processing will not going to be received by the slave BT device 2.

For example, when the period for carrying out the ID packet receiving processing at the slave BT device 2 is 1.28 sec., as the master BT device 1 transmits 16 packers per 10 ms. the number of ID packets during that period will be:

$$16 \times (1280/10) \approx 2000$$

which implies at most about 2000 ID packets will be transmitted from the master BT device 1 but not received by the slave BT device 2, at a time of setting up the connection.

This causes the increase in the power consumption of the master BT device 1, and the radio resources are occupied by the transmission of the ID packets from the master BT device 1, so that there has been a problem that the communication according to the Bluetooth (registered trademark) by the third BT device have to be interrupted during this period.

BRIEF SUMMARY OF THE INVENTION

It is therefore an object of the present invention to provide a communication connection set up method capable of suppressing the period for occupying the radio resource in conjunction with the communication connection set up processing in the short range radio communications, and in particular, the communication connection set up method capable of suppressing the increase in the power consumption of the master BT device 1 due to the ID packet transmission and suppressing the period for occupying the radio resource in conjunction with the connection set up processing, at a time of setting up the communication connection between the Bluetooth (registered trademark) devices by using the Bluetooth (registered trademark) specification.

According to one aspect of the present invention there is provided a method for setting up a communication connection between a first radio communication device that is requesting a set up of the communication connection and a second radio communication device that is a connection target of the communication connection, which carry out data communications by using a frequency hopping scheme, the method comprising: predicting at the first radio communication device a time at which a receiving processing of an identification packet containing an identifier for uniquely identifying the second radio communication device becomes possible at the second radio communication device: transmitting the identification packet from the first radio communication device to the second radio communication device, at the time at which the receiving processing of the identification packet becomes possible at the second radio communication device. In order to synchronize a frequency hopping pattern between the first radio communication device and the second radio communication device; and setting up the communication connection by receiving the identification packet as a response from the second radio communication device at the first radio communication device.

According to another aspect of the present invention there is provide a method for setting up a communication connection between a first Bluetooth device that is requesting a set up of the communication connection and a second Bluetooth device that is a connection target of the communication connection, which carry out data communications by using a frequency hopping scheme, the method comprising: predicting at the first Bluetooth device a time at which a receiving processing of an identification packet containing a device access code of the second Bluetooth device becomes active at the second Bluetooth device; transmitting the identification packet from the first Bluetooth device to the second Bluetooth device. At the time at which the receiving processing of the identification packet becomes active at the second Bluetooth device, in order to synchronize a frequency hopping pattern between the first Bluetooth device and the second Bluetooth device; and setting up the communication connection by receiving the identification packet as a response from the second Bluetooth device at the first Bluetooth device.

Other features and advantages of the present invention will become apparent from the following description taken in conjunction with the accompanying drawings.

BRIEF DESCRIPTION OF THE DRAWINGS

FIG. 6 is a sequence chart showing an outline of conventional paging procedure.

DETAILED DESCRIPTION OF THE INVENTION

Figure 1:
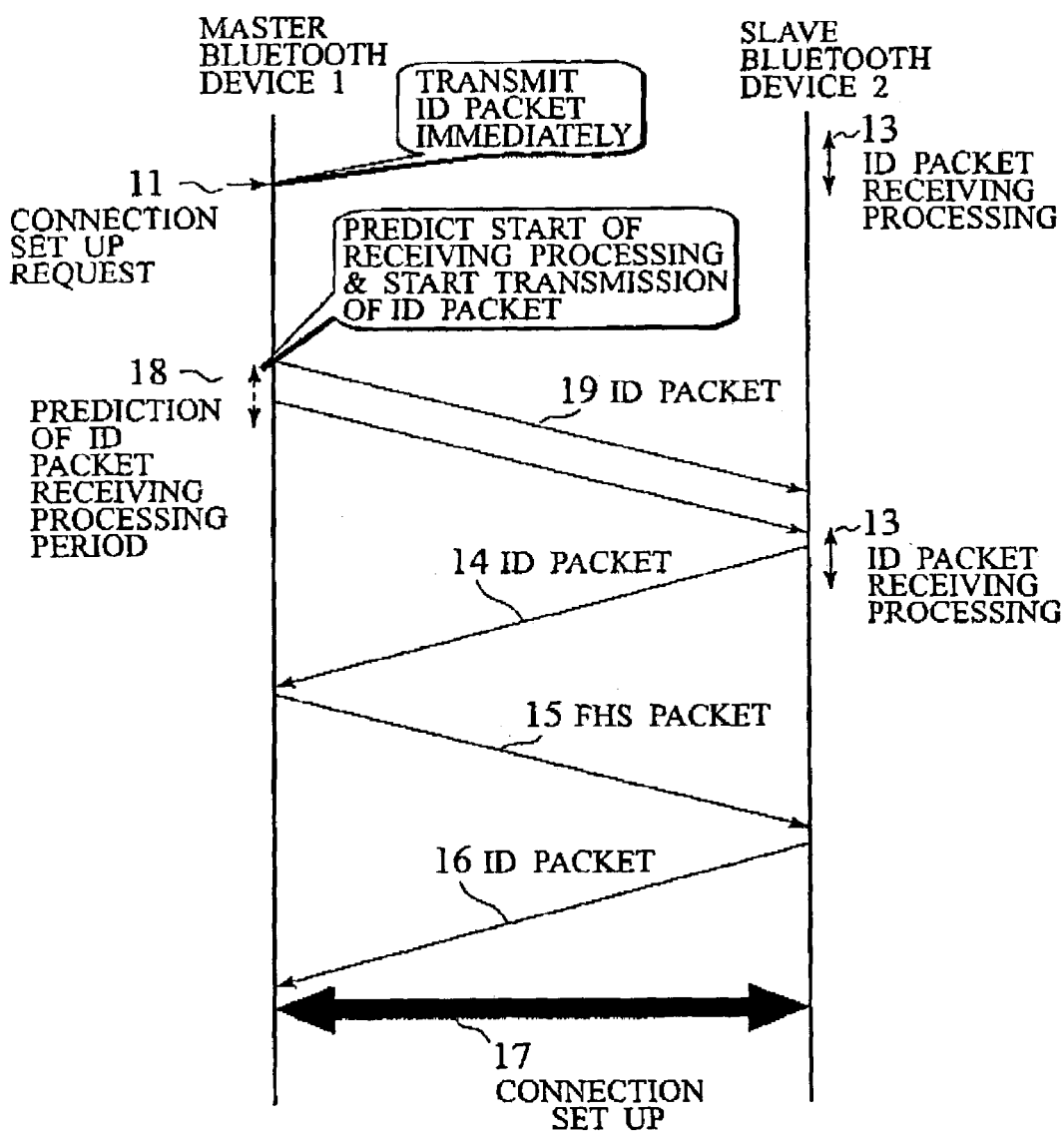
FIG. 1 is a sequence chart showing an outline of a paging procedure according to the first embodiment of the present invention.
Figure 2:
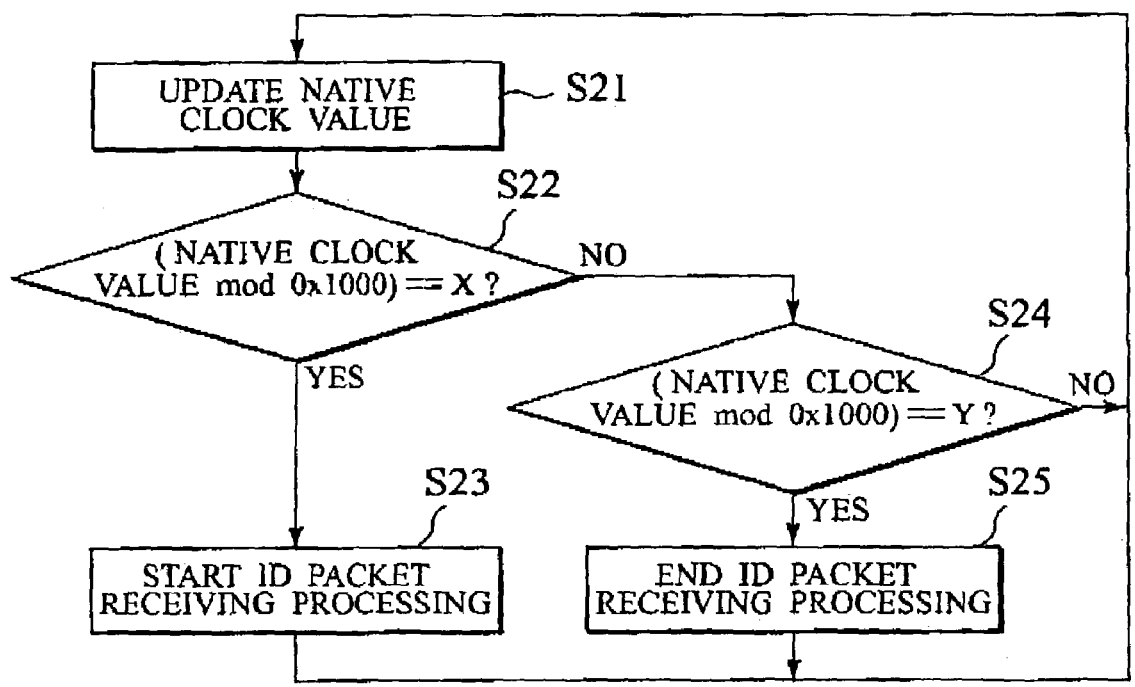
FIG. 2 is a flow chart showing a processing at a slave BT device according to the first embodiment of the present invention.
Figure 3:
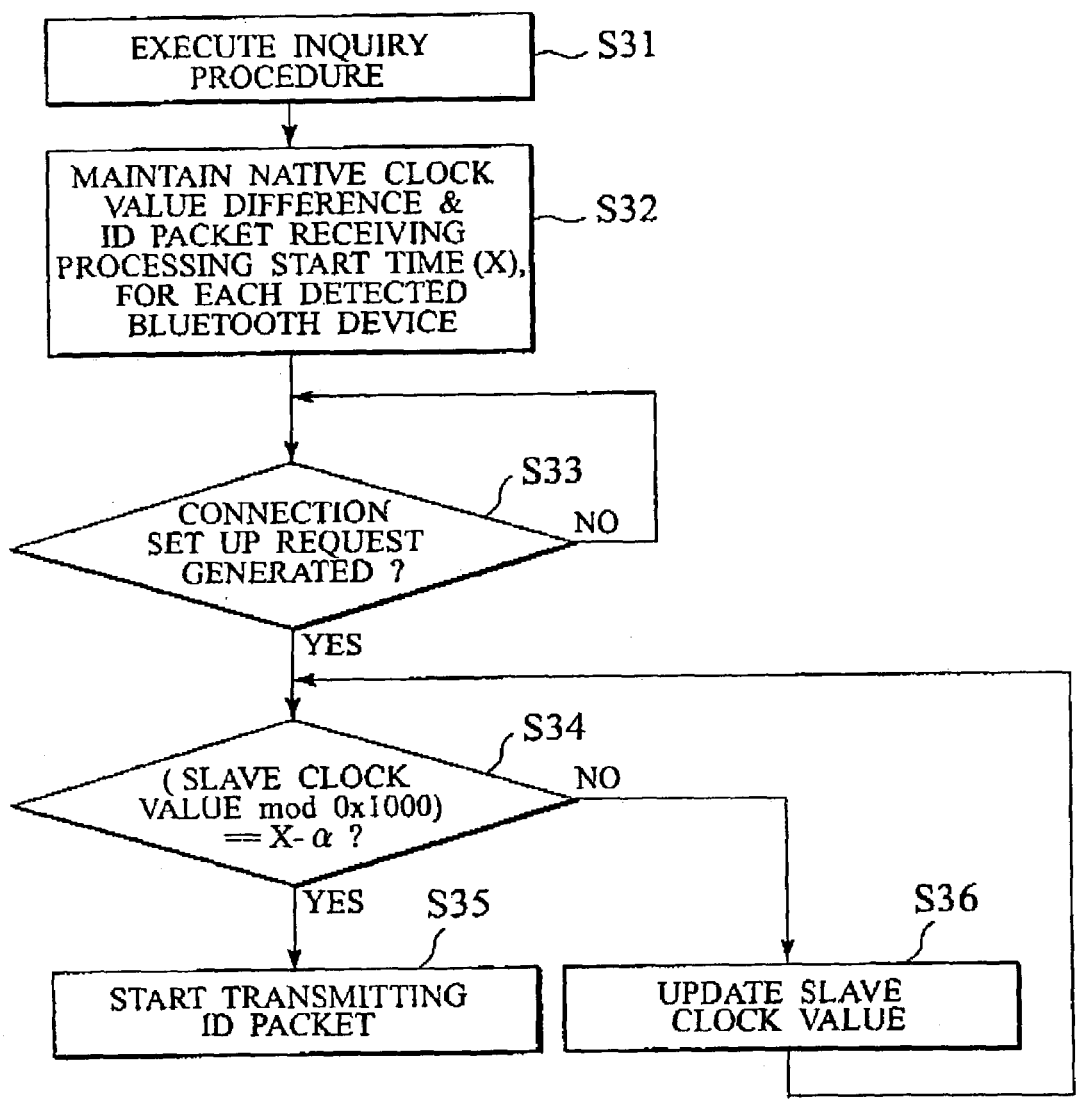
FIG. 3 is a flow chart showing a processing at a master BT device according to the first embodiment of the present invention.

Referring now to FIG. 1 to FIG. 3, the first embodiment of the present invention will be described in detail.

FIG. 1 shows an outline of the paging procedure according to the first embodiment of the present invention.

In FIG. 1, even when the connection set up request with respect to the slave BT device 2 is generated at the master BT device 1 (step 11 of FIG. 1), the master BT device 1 does not immediately start the transmission of the ID packet to the slave BT device 2, and instead the master BT device 1 starts the transmission of the ID packet from a timing at which the ID packet receiving processing is predicted to be carried out at the slave BT device 2 (step 18 of FIG. 1). The prediction of the ID packet receiving processing at the slave BT device 2 by the master BT device 1 will be described in detail below.

FIG. 2 shows the ID packet receiving processing to be carried out periodically at the slave BT device 2. Note that, in general, the native clock value in the BT device is added at every 312.5 μs, and when the period for carrying out the ID packet receiving processing is 1.28 sec., only lower 12 bits of the native clock value become valid, so that in the example of FIG. 2. a value of "native clock value mod 0x1000" is compared with the native clock value.

Whenever the native clock value of the slave BT device 2 is updated (step S21), whether the native clock value indicates a value X for starting the ID packet receiving processing or not is checked (step S22).

If the native clock value is equal to the value X (step S22 YES), the slave BT device 2 starts the ID packet receiving processing (step S23).

Also, whether the native clock value indicates a value Y for ending the ID packet receiving processing or not is checked (step S24), and if the native clock value is equal to the value Y (step S24 YES), the slave BT device 2 ends the ID packet receiving processing (step S25).

In the example of FIG. 2, the slave BT device 2 carries out the ID packet receiving processing for a period of time corresponding to a value "Y–X".

For example, in the case of carrying out the ID packet receiving processing for 11.25 ms, once the native clock value X for starting the ID packet receiving processing is determined, the native clock value Y for ending the ID packet receiving processing is defined as "X+11.25".

By notifying the ID packet receiving processing start time (value X) at the slave BT device 2 used in FIG. 2 to the master BT device 1, the master BT device 1 can predict a time at which the ID packet receiving processing starts at the slave BT device 2. As a result, it becomes possible to control the transmission of the ID packet according to this predicted time.

As for the native clock value of the slave BT device 2, the master BT device 1 can usually acquire the native clock value of the detected BT device by the inquiry procedure which is carried out before the connection set up processing, so that by maintaining a difference between that native clock value and the native clock value of the master BT device 1 itself, it becomes possible to predict the native clock value of the slave BT device 2.

FIG. 3 shows the processing to determine the ID packet transmission processing start time at the master BT device 1.

Note here that the predicted value of the native clock value of the slave BT device 2 by the master BT device 1 will be referred to as a "slave clock value".

The master BT device 1 carries out the inquiry procedure (step S31), and maintains a difference with respect to the native clock value of the master BT device 1 and the ID packet receiving processing start time (X), for each detected BT device (step S32).

When the connection set up request for one of the detected BT devices as the slave BT device 2 is generated (step S33 YES), the slave clock value is generated from the native clock value of the master BT device 1 and the difference between the native clock value of the master BT device 1 and the native clock value of the slave BT device 2, and whether the slave clock value is equal to a value X–α obtained by subtracting an arbitrary value α from the ID packet receiving processing start time X at the slave BT device 2 or not is checked (step S34).

If the slave clock value is equal to the value X–α (step S34 YES), the master BT device 1 starts the transmission of the ID packet (step S35). If the slave clock value is not equal to the value X–α (step S34 NO), the update of the slave clock value is waited (step S36), and the comparison with the value X–α is attempted again (step S34).

Now, a value α used in FIG. 3 is a value determined according to the precision of the native clock value of the detected BT device, which is obtained by carrying out the inquiry procedure.

In the Bluetooth (registered trademark) specification, the precision of the native clock value notified by the FHS packet at a time of the inquiry procedure is 1.25 ms, so that it is preferable to use a setting that satisfies α≧1.25 ms.

Also, in order to notify the ID packet receiving processing start time X at the detected BT device to the master BT device 1, there is a need to newly define a field for describing this value X in the FHS packet, but if this ID packet receiving processing start time is defined to be an identical value for all the BT devices, there is no need to notify this value X to the master BT device 1 at a time of the inquiry procedure.

Figure 4:
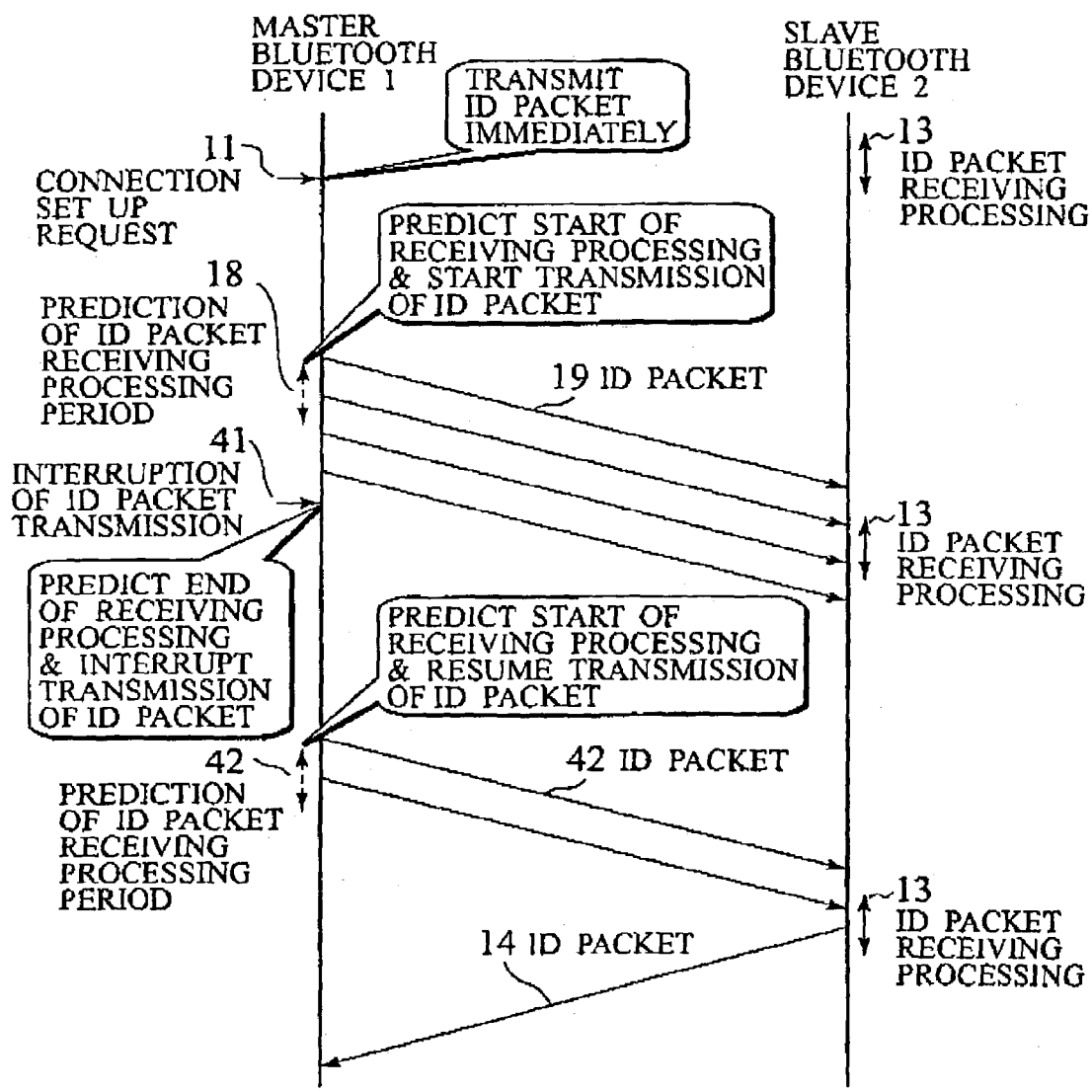
FIG. 4 is a sequence chart showing an outline of a paging procedure according to the second embodiment of the present invention.
Figure 5:
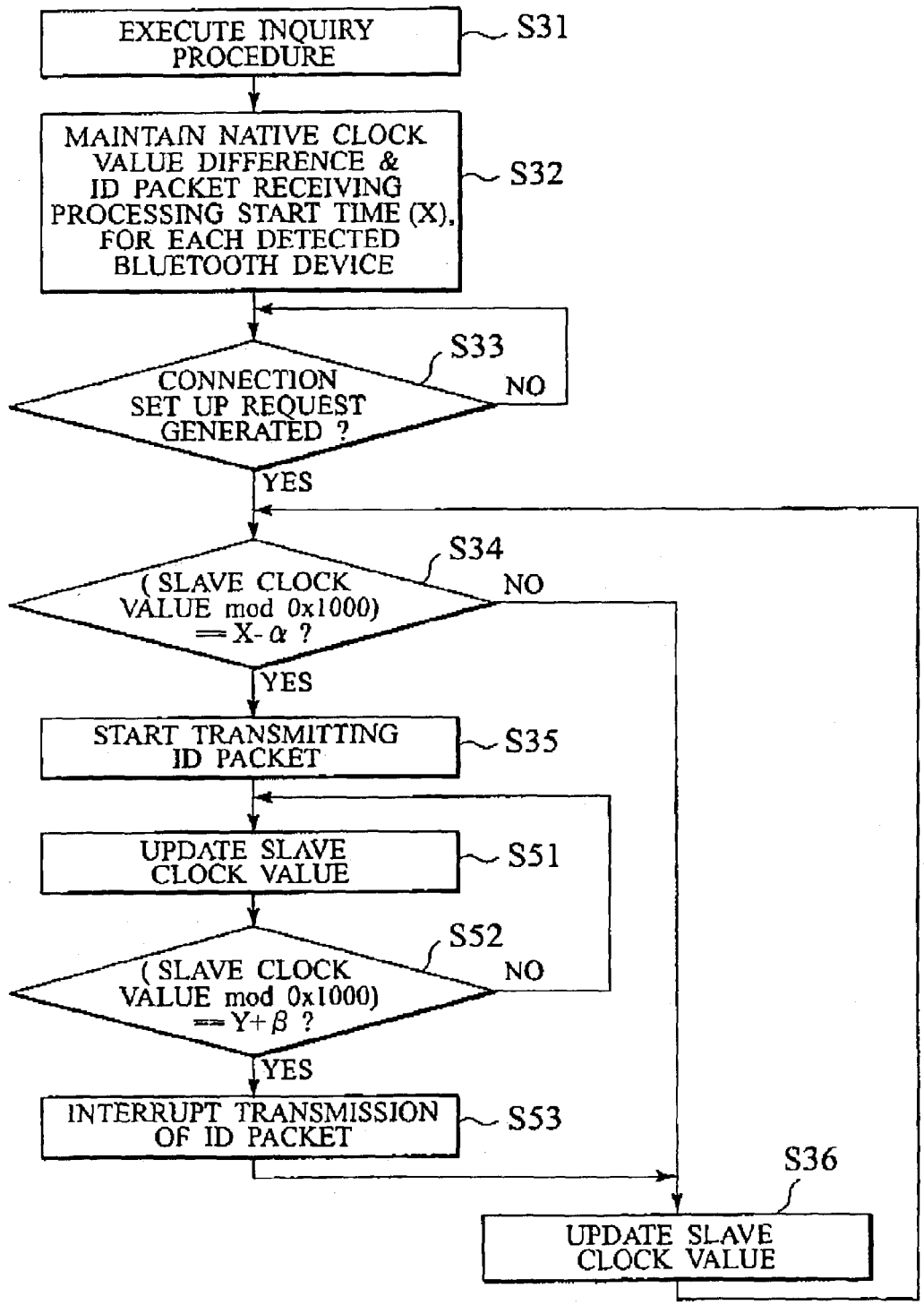
FIG. 5 is a flow chart showing a processing at a master BT device according to the second embodiment of the present invention.

Referring now to FIG. 4 and FIG. 5, the second embodiment of the present invention will be described in detail.

FIG. 4 shows an outline of the paging procedure according to the second embodiment of the present invention.

FIG. 4 differs from the first embodiment shown in FIG. 1 in that the ID packet receiving processing end time at the slave BT device 2 is also predicted by the master BT device 1, and the master BT device 1 interrupts the transmission of the ID packet when it is predicted that the ID packet receiving processing is ended at the slave BT device 2 (step 41 of FIG. 4).

Then, when the master BT device 1 resumes the transmission of the ID packet from a timing at which the ID packet receiving processing is predicted to be carried out again at the slave BT device 2 (step 42 of FIG. 4).

FIG. 5 shows the processing to determine the ID packet transmission processing start time and the ID packet transmission processing interrupt time at the master BT device 1. Note that the processing up to the determination of the ID packet transmission start time is the same as that of FIG. 3.

After the transmission of the ID packet is started, whenever the slave clock value is updated (step S51), the master BT device 1 checks whether the slave clock value is equal to a value Y+β obtained by adding an arbitrary value β to the value Y for ending the ID packet receiving processing at the slave BT device 2 or not is checked (step S52).

If the slave clock value is equal to the value Y+β (step S52 YES), the master BT device 1 interrupts the transmission of the ID packet (step S53). If the slave clock value is not equal to the value Y+β (step S52 NO), the update of the slave clock value is waited (step S51), and the comparison with the value Y+β is attempted again (step S52).

Note that the master BT device 1 ends the transmission of the ID packet upon receiving the ID packet as a response from the slave BT device 2 (step 14 of FIG. 4).

Here, the value β used in FIG. 5 is a value determined according to the precision of the native clock value of the detected BT device, which is obtained by carrying out the inquiry procedure, and similarly as the value α used in FIG. 3, it is preferable to use a setting that satisfies β≧1.25 ms.

Also, the available methods for recognizing the ID packet receiving processing end time Y at the detected BT device by the master BT device 1 include (1) a method for newly defining a field for describing the value Y in the FHS packet, (2) a method for newly defining a field for describing the ID packet receiving processing execution time at the detected BT device in the FHS packet, and deriving the value Y by adding that value to the value X, (3) a method for defining the ID packet receiving processing execution time to be an identical value for all the BT devices, and deriving the value Y by adding that, value to the value X, and (4) a method for defining the value Y to be an identical value for all the BT devices.

As described, according to the present invention, at a time of setting up a communication connection between Bluetooth (registered trademark) devices by using the Bluetooth (registered trademark) specification, the master BT device 1 predicts the ID packet receiving processing start time at the slave BT device 2 and starts the transmission of the ID packet by waiting for the ID packet receiving processing start at the slave BT device 2, so that it is possible to provide the communication connection set up method in which the increase in the power consumption of the master BT device 1 can be suppressed, and the period for occupying the radio resource in conjunction with the connection set up processing can be suppressed.

Thus, according to the present invention, it is possible to suppress the period for occupying the radio resource in conjunction with the communication connection set up processing in the short range radio communications, and in particular, it is possible to suppress the increase in the power consumption of the master BT device 1 due to the ID packet transmission and suppress the period for occupying the radio resource in conjunction with the connection set up processing, at a time of setting up the communication connection between the Bluetooth (registered trademark) devices by using the Bluetooth (registered trademark) specification.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the master BT device of each of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for setting up a communication connection between a first radio communication device that is requesting a set up of the communication connection and a second radio communication device that is a connection target of the communication connection, which carry out data communications by using a frequency hopping scheme, the method comprising:

predicting at the first radio communication device a time at which a receiving processing of an identification packet containing an identifier for uniquely identifying the second radio communication device becomes possible at the second radio communication device;

transmitting the identification packet from the first radio communication device to the second radio communication device, at the time at which the receiving processing of the identification packet becomes possible at the second radio communication device, in order to synchronize a frequency hopping pattern between the first radio communication device and the second radio communication device; and setting up the communication connection by receiving the identification packet as a response from the second radio communication device at the first radio communication device.

2. The method of claim 1, wherein the second radio communication device defines the time at which the receiving processing of the identification packet becomes possible, according to a clock value of the second radio communication device.

3. The method of claim 2, wherein the first radio communication device predicts the time at which the receiving processing of the identification packet becomes possible at the second radio communication device, by maintaining in advance a difference between a clock value of the second radio communication device and a clock value of the first radio communication device, and a specific clock value at which the receiving processing of the identification packet becomes possible at the second radio communication device.

4. The method of claim 1, further comprising:

predicting at the first radio communication device a time at which the receiving processing of the identification packet becomes impossible at the second radio communication device; and interrupting transmission of the identification packet at the time at which the receiving processing of the identification packet becomes impossible at the second radio communication device.

5. A method for setting up a communication connection between a first Bluetooth device that is requesting a set up of the communication connection and a second Bluetooth device that is a connection target of the communication connection, which carry out data communications by using a frequency hopping scheme, the method comprising:

predicting at the first Bluetooth device a time at which a receiving processing of an identification packet containing a device access code of the second Bluetooth device becomes active at the second Bluetooth device;

transmitting the identification packet from the first Bluetooth device to the second Bluetooth device, at the time at which the receiving processing of the identification packet becomes active at the second Bluetooth device, in order to synchronize a frequency hopping pattern between the first Bluetooth device and the second Bluetooth device; and setting up the communication connection by receiving the identification packet as a response from the second Bluetooth device at the first Bluetooth device.

6. The method of claim 5, wherein the second Bluetooth device defines the time at which the receiving processing of the identification packet becomes active, according to a native clock value of the second Bluetooth device.

7. The method of claim 6, wherein the first Bluetooth device predicts the time at which the receiving processing of the identification packet becomes active at the second Bluetooth device, by maintaining in advance a difference between a native clock value of the second Bluetooth device and a native clock value of the first Bluetooth device, and a specific native clock value at which the receiving processing of the identification packet becomes active at the second Bluetooth device.

8. The method of claim 5, further comprising:
predicting at the first Bluetooth device a time at which the receiving processing of the identification packet becomes inactive at the second Bluetooth device; and interrupting transmission of the identification packet at the time at which the receiving processing of the identification packet becomes inactive at the second Bluetooth device.

* * * * *